(12) United States Patent
Partovi et al.

(10) Patent No.: US 8,000,459 B1
(45) Date of Patent: Aug. 16, 2011

(54) SYSTEM AND METHOD FOR A WIRELESS META SERVICE

(75) Inventors: Mohammad Hassan Partovi, Potomac, MD (US); Roy Leo Spitzer, Rockville, MD (US)

(73) Assignee: Nextel Communications Inc., Reston, VA (US)

( * ) Notice: Subject to any disclaimer, the term of this patent is extended or adjusted under 35 U.S.C. 154(b) by 1517 days.

(21) Appl. No.: 11/407,967

(22) Filed: Apr. 21, 2006

(51) Int. Cl.
*H04M 3/42* (2006.01)
*H04M 1/24* (2006.01)
(52) U.S. Cl. ............ 379/201.03; 379/201.01; 379/27.01
(58) Field of Classification Search ............ 379/201.01, 379/201.03, 27.01
See application file for complete search history.

(56) References Cited

U.S. PATENT DOCUMENTS 5,517,562 A * 5/1996 McConnell ............... 379/201.03
7,100,195 B1 * 8/2006 Underwood ..................... 726/2

\* cited by examiner

*Primary Examiner* — Rasha S Al Aubaidi

(57) ABSTRACT

A system and method for creating a custom-developed service by a customer in a service directory of a network service provider are provided. The data defining the custom-developed service received by the network service provider may be tested, corrected, and verified. The service directory may be established in the provider's network to store the data associated with the custom-developed service. Once the custom-developed service is established and operational, the customer or its subscribers may be billed based on their use of the service.

18 Claims, 3 Drawing Sheets

SYSTEM AND METHOD FOR A WIRELESS META SERVICE

BACKGROUND OF THE INVENTION

The present invention relates to wireless services, and more particularly, to the creation and implementation of customer-specific wireless services.

Typically, users (i.e., customers) of wireless networks request particular services from network providers, who develop customer-specific services based on the customers' requests. However, the turn-around time to develop and/or modify customer-specific services is significant. Moreover, as wireless technologies continue to develop and include additional services, such as multimedia services, for example, customers will require more unique, customer-specific wireless services.

The Intelligent Network-2 (IN2) framework developed by Bellcore in the 1980's included limited capability for customer-initiated and customer-driven service definition and creation. However, the IN2 framework fails to meet today's next generation wireless service creation and development needs in a number of ways. For example, the IN2 framework is tied too closely to outdated physical network technology to support delivery of custom features without changes to the network's service infrastructure. The IN2 framework lacks capabilities to test and validate the correctness and integrity of customer defined services in a timely and cost-effective manner. Also, the IN2 framework lacks customized exception handling for customer-defined services.

Additional drawbacks of the IN2 framework include the following. The IN2 servers have to be customized for customer needs, leading to slower development times. Once services are defined and implemented in the IN2 framework, there is no mechanism to modify and/or extend the capabilities of the services. The IN2 service definition and creation capabilities are quite limited and cannot be expanded. Moreover, validation and verification of customer-defined and developed services remains a significant problem in an IN2 framework.

SUMMARY OF THE INVENTION

The present invention provides a system and method for a wireless meta service, which is a service used to define wireless services.

According to exemplary embodiments of the present invention, a customer (e.g., network operator) may define its own custom-developed service in a network service provider's infrastructure. The customer may input the data defining the custom-developed service into a service directory of the network service provider. The data defining the custom-developed service received by the network service provider may be tested, corrected, and verified. Once the custom-developed service is established and operational, the end subscriber may be billed based on its use of the service.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
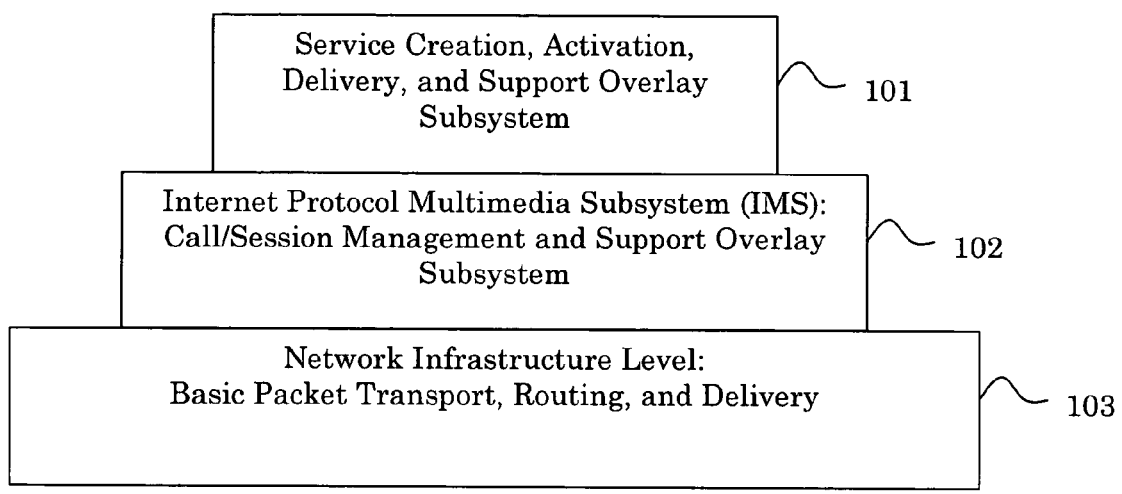
FIG. 1 illustrates a layered view of a next generation wireless network architecture in accordance with the present invention.

FIG. 1 illustrates a layered view of a next generation wireless network architecture in accordance with the present invention. As illustrated in FIG. 1, an upper layer 101 includes a service creation, activation, delivery, and support overlay subsystem. In the upper layer 101, a custom service development package (CSDP) and meta-service control functions (MSCF) may be present, including, for example, service creation building blocks and service activation, delivery, and execution primitives. The service creation building blocks may include create service, delete service, define service parameters, define service logic, modify service parameters, and modify service logic, for example. The service activation, delivery, and execution primitives may include locate subscriber, alert subscriber, and retrieve directory information, for example. The MSCFs ensure the integrity of the system during its normal daily operation, as well as troubleshooting a custom-developed service and suspending/resuming a custom-developed service that may be malfunctioning.

Each service is defined with policies associated with the use of that service. Since service creation itself is a service, the use of service creation can be allowed, constrained, or restricted just like the execution of services created by the service provider. The use of any service including service creation can be metered and tariffed according to service provider policy.

A middle layer 102 illustrated in FIG. 1 includes an internet protocol multimedia subsystem (IMS), which provides call or session management and a support overlay subsystem. The IMS is an open, standardized, Next Generation Networking (NGN) multi-media architecture used to provide mobile and land-based IP services. NGN networks combine data and voice in a single packet switched network. The IMS includes a generalized soft switching overlay infrastructure, which includes elements such as an interrogating call session control function (I_CSCF), a serving call session control function (S_CSCF), a proxy call session control function (P_CSCF), a media gateway (MGwy), a media gateway controller function (MGCF), a media resource function (MRF), a breakout gateway control function (BGCF), and a signalling gateway (SG), for example.

A bottom layer 103 of the network architecture illustrated in FIG. 1 includes the network infrastructure level, which provides basic packet transport, routing, and delivery for a network. Included in the basic network infrastructure may be a radio access network (RAN), backhaul, addressing, routing, mobility management, authentication, and authorization, for example.

Figure 2:
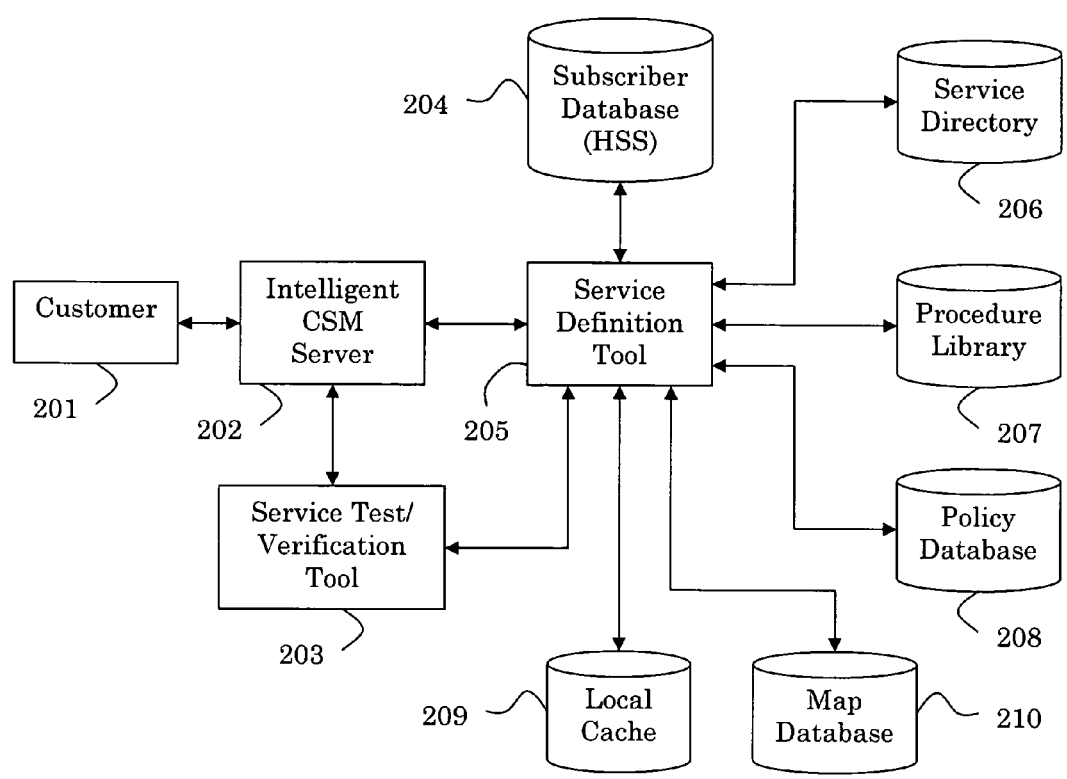
FIG. 2 illustrates an exemplary embodiment of a system in accordance with the present invention.

FIG. 2 illustrates an exemplary embodiment of a system in accordance with the present invention. A customer 201 (e.g., a network operator, enterprise service operator, or end subscriber) may interface with the system via an Intelligent Customer Service Management (CSM) Server 202. For example, the customer may access the Intelligent CSM Server 202 via a remote computer having a program which provides a graphical user interface for the customer to input data. Typically, the operator uses the meta-service to create canned procedures to manage subscribers or to support specialized subscriber services that distinguish one network operator or enterprise service operator from his competitors. In an exemplary embodiment of the present invention, the customer may be a subscriber of a network operator. The Intelligent CSM Server 202 provides the infrastructure and scheduling for all meta-services. The Intelligent CSM Server 202 calls all necessary application primitives necessary to perform the intended functions created by the customer. Prior to the execution of a service through the interaction with the Intelligent CSM Server 202, the operator defines his own custom-developed service for network maintenance, subscriber maintenance, and subscriber usage.

To define a custom-developed service, a customer who has very little programming skill may use a scripting language similar to CPL or Perl, for example. More sophisticated customers may use a high-level computer programming language, e.g., C, C++, Visual Basic, etc. Also, the customer may develop service flow logic procedures for his custom-developed service utilizing existing or new service primitives, various subscriber and service directories, other data stores, and external information sources.

Using the Intelligent CSM Server 202, the customer creates a custom-developed service in the provider network's Service Directory 206. The Service Directory 206 may contain a master index for all services available to the enterprise customer. It may also contain customer policy enforcement constraints for using particular services. The Service Directory 206 may contain public custom-developed services and private custom-developed services, as well as default predefined services common and accessible to all subscribers of the services.

The custom-developed service is tested and verified using the Service Test/Verification Tool 203. The Service Definition Tool 205 provides the ability to create and modify a service. This tool, in combination with the Service Test/Verification Tool 203, allows the customer to generate/modify and validate any new service.

The Service Test/Verification Tool 203 provides a software development kit (SDK) for debugging and limited execution. The SDK allows the customer to validate the meta-service process created without formally installing the process for wide subscriber usage. The service test tools may include an interpreter/compiler, a simulator/debugger, service management, policy management, simultaneity control, a script processor, meta-service software development kit access/usage rights, and meta-service software development kit accounting/billing, for example.

After appropriate testing, corrections, and verification, the customer finalizes the custom-developed service and places the service and its associated components into a customer-based service library, e.g., Procedure Library 207, using meta-service control functions. A table of exemplary meta-service control functions is shown in Table 1.

TABLE 1

| Control Function | Description |
| --- | --- |
| ModifyUserClassProfile | User Classes are typically defined as business, gold, silver, and bronze. Each class has a configurable peak rate and guaranteed rate. This function modifies the class configuration. |
| ModifyUserClassRelationship | Each user is a member of one and only one user class. This function modifies the user class membership. |
| MetaSrv2Environment | Allows the meta service to be used in one of the following environments: debug, trace, restricted use, and activated. |

TABLE 1-continued

| Control Function | Description |
| --- | --- |
| Associate ChargingWithSrv | Associates a tariff with the use of a meta service. |
| AssociatePrivlegeWithSrv | Associates a set of access rights with the meta service. From a policy standpoint, these access rights define the minimum access level of the user. |
| ModifyUserRadioPreferences | Modifies user's radio preference profile. |
| DisableServiceFailure | Disables service operation if too frequent failures. |
| MaxSimultaneousInstances | Defines maximum simultaneous instances of a meta service. |
| AddMetaServiceToLibrary | Adds a service to the library of meta services. |
| ActivateService | Activates a service. (Allows public usage of the defined service function) |
| ControlService | Debug, make operational, suspend, or lock service. |
| InstallPrimitive | Install a service primitive. |

The Procedure Library 207 contains procedures that can be called by services. These procedures are standard library functions that have been defined by the meta service infrastructure. The standard library functions, also known as meta service primitives, may include GetUserName, GetUserProfile, DisplayDataOnScreen, GetTimeAndDate, and FindLocation, for example. These and many other exemplary meta service primitives are illustrated in Table 2. Although most of the primitives in Table 2 are self-explanatory, some of the primitives include a description thereof to further clarify their meaning. In addition, there are other library functions where the service may retrieve information for another site (URL or IP-addressable). The Procedure Library 207 may comprise a database, which may be created and populated by a customer.

TABLE 2

Meta Service Primitives

| Primitive | Description |
| --- | --- |
| GetUserName | |
| GetUserProfile | Get user subscription options and policy definition. |
| GetUserSubscriptionOptions | Get any user subscription options including associated address (E.164 numbers, UFMI, global assigned IP address, subscription options, subscribed class of service, etc.) |
| AuthorizeServiceUsage | Validate user's rights to run this meta-service. |
| CheckUserQOSRequest | Validate that the network can support the requested user QOS. |
| GetUserEnvironment | Get the attributes of the application in which the user is operating. This would include but is not limited to RF protocol, Authentication protocol, etc. |
| AdjustToBestQOS | Find the QOS that best meets the requested QOS. |
| CheckCongestionCondition | Determine if there is congestion on the negotiated path. |
| GetNumberActiveUsers | |
| GetNumberClassUsers | Retrieves the Number of Active users that are members of user's class. |
| DisplayDataOnScreen | |
| NotifyOnRawKeyboardInput | Defines an event for any raw user keyboard input. |
| NotifyOnKeyboardMappedInput | Defines an event for when any one of the desired mapped input. The user requests either standard key |

TABLE 2-continued

Meta Service Primitives

| Primitive | Description |
|---|---|
| | input that may change multiple keystrokes into an alphabetic character or service defined input. |
| RecordVoice | |
| PlaceInVoiceCatalog | Place sound file in voice catalogue for future comparisons. |
| NotifyVoiceMatch | Notify when voice has been decoded into text. |
| TakePicture | |
| StorePicture | |
| SendPicture | |
| ReceiveMultiMedia | |
| SendMultimedia | |
| RequestMultiMediaReceiveGranularity | Protocols such as MPEG allow for both basic bits and enhanced bits. This indicate the maximum received data granularity the user is willing to access due to environmental or budget constraints. |
| MultiMediaSendGranularity | This allows storage of higher quality multimedia than is sent. |
| LookUpUserContact | |
| GetUserPresence | |
| GetTimeAndDate | |
| GetCalendar | Get user calendar |
| SetAppointment | |
| MoveAppointment | |
| DeleteAppointment | |
| GetCurrentPosition | Get coordinates for current position |
| FindLocation | |
| TrackLocation | Take periodic snap shots of current local with associated timestamps |
| AnticipateLocation | Take the track location buffer and extrapolate the anticipated location at a given time |
| GetEnvironConditions | Get current environmental conditions such as temperature, humidity, and wind speed. |
| GetCurrentCoverageInfo | Get radio type, frequency, and signal strength of current MS location. |
| GetUserRadioPreferences | Get user's radio preference profile. |
| ChooseActiveRadio | Force the user to use a particular radio type, frequency, and signal strength based on current coverage information. |
| PlayAudioTone | Used for ring back tone |
| PlayCallWaitingTone | |
| GetCallerID | |
| ForwardCall | |
| TransferCall | |
| ForwardCallToVoiceMail | |
| DiscardCall | |
| RecordCallFrequency | |
| EstablishConferenceCall | |
| JoinConference Call | |
| LeaveConferenceCall | |
| InitiateCallRecording | |
| TerminateCallRecording | |
| GetCallStatus | |
| GetAvailableBandwidth | |
| ProvideMultiChannelSupport | |
| TerminateMultiChannelSupport | |
| EventOnTimeOfDay | Event will occur based on time of day. |
| EventOnLossOfCoverage | Event will occur based on loss of coverage. |
| EventOnCoverageAvailability | Event will occur based on coverage available. |
| EventOnLocationMatch | |
| EventOnIncomingCallType | Event is based on protocol type and/or call type. For example, a user might want to process voice differently from multimedia. |
| EventOnSpecificCaller | |
| EventOnCallTermination | |
| WaitOnEvent | |
| PollForEvent | |
| AcknowledgeEvent | |
| InterruptServiceOnEvent | |
| InitiateServiceOnEvent | This allows launching of a service when a particular event occurs. |
| DefineEventQueueBetweenServices | Define a message queue between two service functions. Once the queue is defined, another meta-service may link to that queue to send and/or receive messages/events. |
| Link2EventQueue | Setup a binding between a predefined event and this service. |
| QueueEvent | |
| ServiceNextEventInEventQueue | |
| FlushEventQueue | Clear all events in the event queue without servicing them. |
| LocalMapLookup | Obtain a map and/or location based on lookup parameters. |
| TriggerMetaServiceBasedOnTime | Start, terminate, or suspend a meta-service based on wall clock time. |
| SuspendDialogOnChannel | |
| ResumeDialogOnChannel | |
| GenerateCallWaitingIndication | Wait until a new event is present. |
| UnicastBidirectionalDialogueCtrl | Initiate, Terminate, Suspend, Resume |
| UnicastSingleDirectionDialogueCtrl | Initiate, Terminate, Suspend, Resume |
| BroadcastDialogueCtrl | Initiate, Terminate, Suspend, Resume |
| NotifySubscriber | |
| AcknowledgeSubscriberNotification | |
| RequestMediaEncryption | |
| StartMediaEncryption | |
| EndMediaEncryption | |
| BandwidthAvailableLookup | Determine what bandwidth is available. |
| VocodersSupported | Determine which vocoders the system supports. |
| ChooseVocoders | Negotiate vocoder for channel. |
| ConvertAmongUserAddresses | E.164, eNUM, URI, etc. |
| DetermineFundsInPrepaidAccount | Lookup the current funds available on the count to determine if the call should proceed. This can also be used to mode of conversation. For example, use Push to Talk unless available funds is greater than a configured amount. |
| LookupExternalEventsCalendar | Movies, Plays, Sports, etc. |
| Lookup CurrentStockPrices | |
| RetrieveInfoFromExternalHost | This allows use of external internet services such as google, weather, traffic, etc. |

The Subscriber Database (e.g., HSS) 204 illustrated in FIG. 2 provides the logical combination of Home Location Register (HLR) and subscriber (user) specific profiles. The Subscriber Database 204 may be a distributed database where the authentication information is kept in the HLR or AAA and any additional information could be augmented by a database not stored together with the HLR.

In exemplary embodiments of the present invention, private service specific data may be added to the Subscriber Database 204.

The operator creates and populates a Policy Database 208 for service activation and service policy management. The Policy Database 208 links the subscribers to the service. This link contains any security information such as ACLs, environments in which service can be used, and any associated accounting triggers and/or parameters.

FIG. 2 also illustrates a Map Database 210, which is the foundation for both location based services and web based services. The Map Database 210 may contain positional information of geographical reference points viewed by the customer. These reference points may be home, office, doctor's office, grocery store, theater, etc. The caching of these reference points allows for quick retrieval (lookup procedures) for determining relative relationships between users and service. The Map Database 210 may also contain service constraints which require the user to have physical proximity and/or access to a reference point instead of web only based access.

Also illustrated in FIG. 2 is a Local Cache 209, which allows the service to store parameters for future use. This procedure becomes significant when one meta-service populates a large amount of data and then calls another service to manipulate that data.

Once a custom-developed service is operational, the service developed by the meta-service can provide tariffing information from which the customer or its subscribers may be billed based on their use of the service.

According to exemplary embodiments of the present invention, the custom-developed service is independent of which application server is used and which platform used to develop the service.

Figure 3:
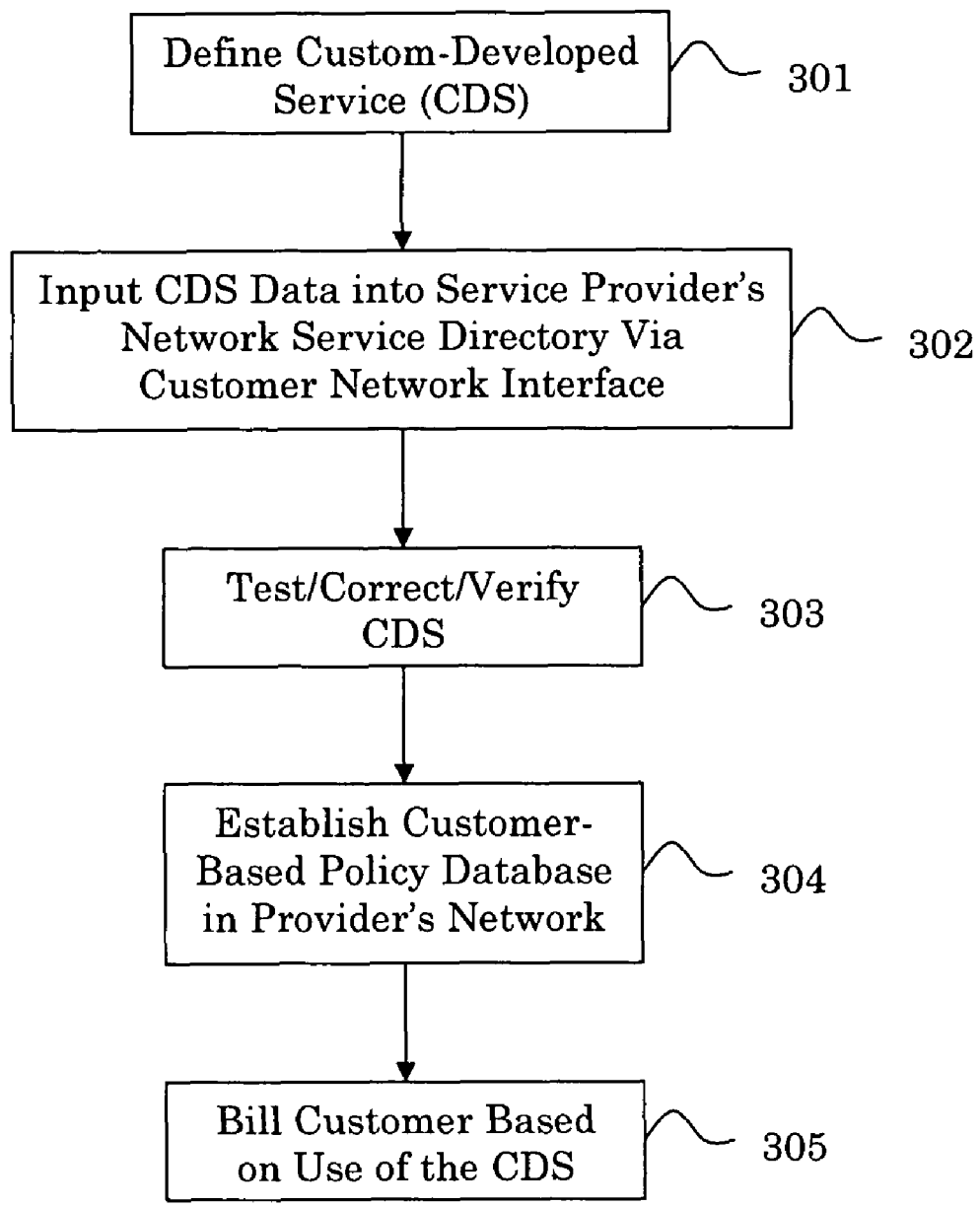
FIG. 3 illustrates an exemplary embodiment of a method in accordance with the present invention.

FIG. 3 illustrates an exemplary embodiment of a method in accordance with the present invention. In step 301 of FIG. 3, a customer defines his own custom-developed service. The customer may use a scripting language, for example, CPL, Perl, etc., or a high-level computer programming language, for example, C, C++, Visual Basic, etc., to define the custom-developed service. In step 302, the customer transfers custom-developed service data into a service provider's network service directory (e.g., Service Directory 206 of FIG. 2), which may be done via a customer network interface. The customer network interface may be provided by an Intelligent CSM Server 202, as illustrated in FIG. 2.

After the custom-developed service data has been transferred to the service provider's network service directory, the custom-developed service data may be tested, corrected, and verified. These operations may be performed in step 303 of FIG. 3. After the testing, correction, and verification are complete, the customer may establish a policy database (e.g., Policy Database 208 in FIG. 2) in the service provider's network in step 304. The policy database may be used for enforcing constraints of using the custom-developed service. For example, authorizing use of the custom-developed service may be based upon information stored in the policy database. Once the custom-developed service has been set up and begins operating, the customer or its subscribers may be billed for use of the custom-developed service in step 305.

Exemplary embodiments of the method may further include determining whether a number of errors occurring during operation of the custom-developed service exceeds a predetermined value or frequency (limit); and disabling the custom-developed service, if it is determined that the number of errors exceeds the predetermined value. The predetermined value may include a particular number of errors or a rate of errors.

The wireless services available to users of the system and method in accordance with the present invention may include a variety of features. For example, a user may request information about the nearest place of interest, e.g., a hospital, grocery store, restaurant, etc., and the service may provide the name, address, directions and a map to the place of interest.

Also, the user could request information about the nearest movie theatre playing a particular movie at a particular time. As another example, the user could implement an alert service for traffic congestion. A meta server could have the user's daily commute path information stored. During a certain time range each morning, for example, the service could check road condition databases, inform the user of traffic congestion along the commute path, and provide alternate route suggestions to the user. Many other services could be implemented, such as providing daily stock market information to the user and managing multimedia conferences involving the user, for example.

Once a custom-developed service has been defined, modifications of the service may be achieved in a manner similar to that for defining the service. In particular, the customer would use the customer network management server to modify the service by entering/modifying the data defining the service.

During operation of the custom-developed service, if a network provider determines that a network in which the custom-developed service is operating has entered a congested state, an amount of service data available to the customer may be reduced. The customer or the network provider may establish triggers to throttle data based on the level of congestion in the network. This throttling may occur at multiple protocol level. Today, typically throttling only occurs at the MAC or transport level. The custom developed service may allow the user to dynamically select whether the user values clarity or timeliness more. For example, if the user valued timeliness, only basic encoding would be sent over the network. When the congestion was alleviated, enhance packets could also be transmitted.

While the invention has been described in connection with various embodiments, it will be understood that the invention is capable of further enhancements and extensions. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method to create a custom-developed service by an end subscriber of a wireless communication system in a service directory of the wireless communication system, the method comprising:
   receiving, by a customer management server of the wireless communication system from the end subscriber of the wireless communication system, a data defining the custom-developed service in the service directory of the network provider through a customer network management interface;
   verifying, by a system test and verification unit of the wireless communication system, the data defining the custom-developed service;
   creating and populating a service library, by a service definition unit of the wireless communication system, based upon the verified data;
   testing and validating, by the system test and verification unit of the wireless communication system, the custom-developed service;

providing, by a service directory unit, the custom-developed service to other end subscribers of the wireless communication system, if the custom-developed service is validated on the network service test/validation tool;

determining, by the system test and verification unit of the wireless communication system, whether a number or frequency of errors occurring during operation of the custom-developed service exceeds a predetermined value; and disabling, by the system test and verification unit of the wireless communication system, the custom-developed service, if it is determined that the number or frequency of errors exceeds the predetermined value.

2. The method of claim 1, further comprising:
billing the end subscriber for use of the custom-developed service.

3. The method of claim 1, further comprising:
defining the custom-developed service using a scripting or a high-level programming language.

4. The method of claim 1, further comprising:
modifying, by a service definition unit of the wireless communication system, the custom-developed service, based upon inputs from the end subscriber.

5. The method of claim 1, wherein the custom-developed service is independent of an application server used and a platform used to create the custom-developed service.

6. The method of claim 1, further comprising:
authorizing, by the wireless communication system, use of the custom-developed service based upon information stored in a policy database.

7. The method of claim 1, further comprising:
accessing, by the customer management server of the wireless communication system, a database of service primitives which are selectively included in the custom-developed service, based on the received data.

8. The method of claim 1, further comprising:
accessing, by the customer management server of the wireless communication system, the service library containing a plurality of meta service primitives used by the custom-developed service.

9. The method of claim 1, wherein the custom-developed service is developed on an internet protocol multimedia subsystem based platform.

10. The method of claim 1, further comprising:
inputting, by the customer management server of the wireless communication system, private meta service specific data to a subscriber database.

11. The method of claim 1, further comprising:
operating, by the wireless communication system, the custom-developed service.

12. The method of claim 1, further comprising:
reducing, by the wireless communication system, an amount of service data available to the end subscriber of the wireless communication system, during operation of the custom-developed service, if a network in which the custom-developed service is operating has entered a congested state.

13. The method of claim 1, further comprising:
authorizing, by the policy database, use of a custom service development package for developing the custom-developed service.

14. The method of claim 13, wherein the custom service development package comprises the customer service management server, a service definition unit, and the service test and verification unit.

15. A wireless communication system in which an end subscriber creates a custom-developed service in a service directory of the wireless communication system, comprising:
a customer service management server configured to provide the end subscriber with an interface to input data defining the custom-developed service to the wireless communication system;
a service definition unit configured to define the custom-developed service, based upon the data;
a service test and verification unit configured to test and validate the custom-developed service, to determine whether a number or frequency of errors occurring during operation of the custom-developed service exceeds a predetermined value, and to disable the custom-developed service when it is determined that the number or frequency of errors exceeds the predetermined value; and
a database configured to store the data defining the custom-developed service, the database comprising a service directory,
wherein the custom-developed service is made available to other end subscribers via the service directory of the database, if the customer-developed service is validate on the service test and verification tool.

16. The system of claim 15, further comprising:
a service library including a plurality of meta service primitives.

17. The system of claim 15, further comprising:
a subscriber database configured to provide subscriber-specific profiles.

18. The system of claim 15, further comprising:
a map database configured to store positional information of geographical reference points.

* * * * *